United States Patent [19]

Webb

[11] 3,714,819

[45] Feb. 6, 1973

[54] APPLANATION TONOMETER COMPRISING POROUS AIR BEARING SUPPORT FOR APPLANATING PISTON

[75] Inventor: Robert H. Webb, Lexington, Mass.

[73] Assignee: Block Engineering, Inc., Cambridge, Mass.

[22] Filed: Nov. 19, 1970

[21] Appl. No.: 90,893

[52] U.S. Cl. .................................. 73/80, 128/2.05 E
[51] Int. Cl. ........................... A61b 3/16, A61b 5/02
[58] Field of Search .......... 73/80, 81, 83; 128/2.05 G, 128/2.05 Q, 2.05 E, 2.05 D

[56] References Cited

UNITED STATES PATENTS

| 3,099,262 | 7/1963 | Bigliano | 128/2.05 |
| 3,299,882 | 1/1967 | Masino | 73/80 |
| 3,388,585 | 6/1968 | Hargens | 73/453 X |

Primary Examiner—James J. Gill
Assistant Examiner—C. E. Snee, III
Attorney—Schiller & Pandiscio

[57] ABSTRACT

An applanation tonometer using a pneumatically driven piston having a sensing tip operated by the gas driving the piston, in which a porous gas bearing serves both as a bearing for the piston and a throttling barrier for gas introduced to drive the piston.

2 Claims, 2 Drawing Figures

PATENTED FEB 6 1973
3,714,819
FIG. 1.
FIG. 2.
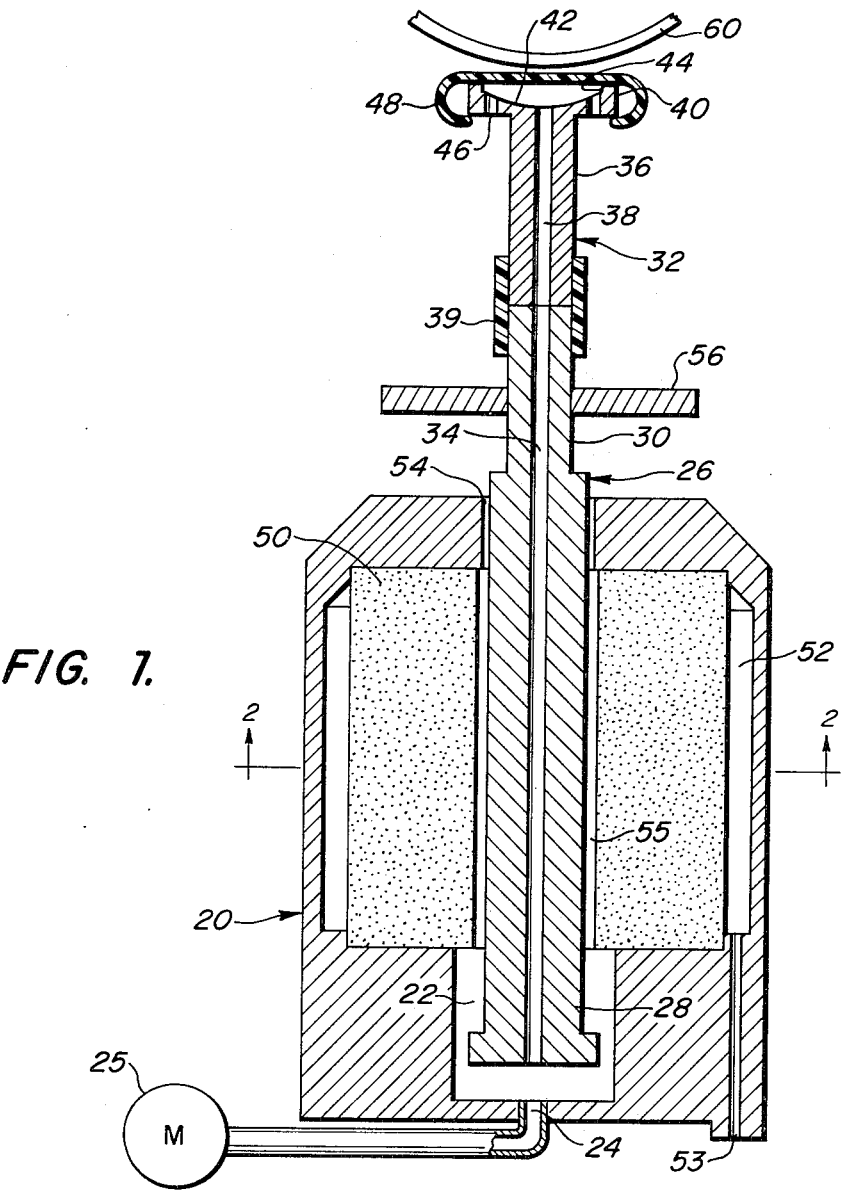
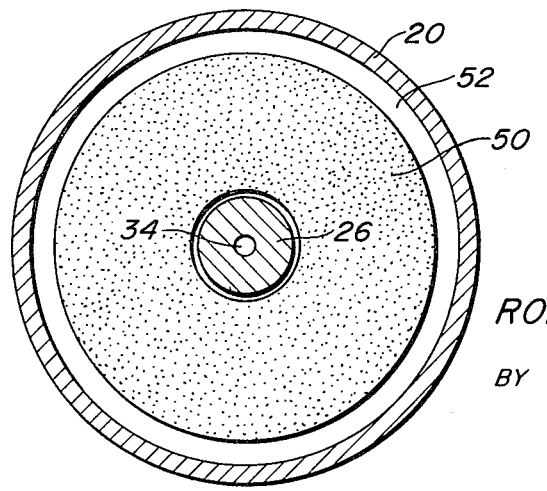
ROBERT H. WEBB
INVENTOR.
BY
Schiller & Pandiscio
ATTORNEYS.

APPLANATION TONOMETER COMPRISING POROUS AIR BEARING SUPPORT FOR APPLANATING PISTON

This invention relates to pressure measurement devices and more particularly to an improved device for measuring the pressure of a biological fluid in vivo without physically contacting the fluid.

The importance in medical diagnostics of measuring fluid pressure through a biological membrane, particularly blood and intraocular pressure, has spurred substantially development of a variety of devices. One group of such devices, particularly suited for measuring intraocular pressure, is known as applanation tonometers and is typified by the device described in U. S. Pat. No. 3,099,262.

Applanation tonometers operate by first flattening a given area on the surface of the membrane which is under pressure from the fluid. A gentle but steadily increasing force is exerted by the tonometer over that area, until the external applied pressure matches the internal supporting pressure of the fluid, at which point a pressure equilibrium occurs. By first flattening a given area of the membrane, supporting effects due to the stiffness of neighboring body tissue are minimized so that the measured external pressure is related to only the internal fluid pressure and to the stiffness of the body tissue directly within the area of contact. Various methods have been devised to compensate for this remaining membrane stiffness, based on the fact that the area of contact involved is substantially a constant. One particularly useful device for achieving this compensation is the pneumatic pressure sensing head described in the aforesaid U.S. Pat. where the measured pressure is related to the actual pressure by a constant of proportionality which is a function only of the dimension of the pressure sensing head.

This type of pressure sensing device is usually manually held. Since the forces involved are of such small magnitude and since hand movements are of such a gross nature, reproducible flattening has been difficult to achieve. Another problem is found in the fact that different membranes in different people have different surface characteristics, so that a different pressure must be exerted to flatten a given area of the membrane.

Several approaches have been taken to correct these difficulties. The simplest and most obvious manner is to repeat the measurement several times to average out the effect of any unsteadiness in the hand of the user, as well as variations in the character of the surface of the different membranes. A more sophisticated method is discussed in U.S. Pat. No. 3,299,882, where a gimbled self-conforming mount is used to accommodate the pressure sensing device to the body site. A different, but very effective approach is to provide a mounting for the pressure-sensing element such that once the latter is in stable contact with the membrane, the motion of the pressure-sensing element is independent of the gross movements of the mount. In such a case, other forces which previously had been considered of secondary importance, now are seen to affect the accuracy of measurement.

Accordingly, it is an object of the present invention to provide an improved tonometer wherein substantial freedom is achieved from frictional effects.

Other objects are to provide a fluid pressure operated tonometer wherein substantial constancy of flow of gas is assured; to provide such a tonometer which is simple and relatively inexpensive to manufacture, yet is capable of functioning with improved accuracy due to the comparative freedom from the effects of friction and contaminants in the operating fluid; and to provide such a tonometer in which the number of parts is reduced.

These and other objects are achieved by providing a pneumatic applanation tonometer having a cylinder and piston arrangement wherein the latter is mounted for movement within the former by pneumatic pressure and a known membrane tip is provided for the piston, a leakage path being supplied for the operating gas from the cylinder through the piston to the tip. The piston is mounted within the cylinder for movement within a porous gas-permeable bearing which provides a film of gas upon which the piston rides with negligible friction and accurate alignment. The bearing also serves to provide throttling which keeps the operating gas flow into the cylinder at a substantially constant level.

Other objects of the present invention will, in part, be obvious and will, in part, appear hereinafter. The invention accordingly comprises the apparatus possessing the construction, combination of elements, and arrangement of parts which are exemplified in the following detailed disclosure, and the scope of the application of which will be indicated in the claims. for a fuller understanding of the nature and objects of the present invention, reference should be made to the following detailed description taken in connection with the accompanying drawings, wherein:

FIG. 1 is a schematic, side-elevational cross-sectional view through a preferred embodiment of the pressure-sensing head of the present invention.

FIG. 2 is a cross-section of the device of FIG. 1 taken along the line 2—2.

Referring now to the drawing, the embodiment shown therein will be described in connection with air as the operating fluid although it will be appreciated that it is not so limited. The device includes a cylinder or enclosure 20 adapted to be hand-held, and having a driving air chamber 22 disposed therein. The latter is pneumatically connected with port 24 at which the air pressure within chamber 22 can be measured by any of a number of known pressure gauges or manometers shown generally at 25.

At elongated piston 26 preferably of stainless steel is provided having one end 28 thereof positioned within chamber 22, the other end 30 extending outwardly from enclosure 20. Disposed, at end 30 is membrane depressor tip 32. The latter is of known structure, typically being formed as described in U.S. Pat. No. 3,099,262 and while an important feature of a preferred pneumatic applanation tonometer, is not considered part of the present invention. An air channel 34 extends longitudinally within preferably the center of piston 26 from end to end, opening at end 28 into chamber 22.

Depressor tip 32 may, as shown, be formed of a tubular base 36 having a hollow interior channel 38 therein communicating coaxially with channel 34 typically by virtue of a press fit within a coupling formed by flexible tube 39 engaging one end of the tip and end 30 of the piston. This coupling provides that the tip can yield laterally in its mounting, and in effect, provides limited gimbaling. Channel 38 extends to and opens at the opposite end of tip 32 at the center of depressor disc 40, the latter typically being shaped as a substantially circular wafer having a concavely dished face 42. The periphery of disc 40 is provided with an upstanding annular ridge 44.

One or more (six in the preferred embodiment) air escape ports 46 are provided for pneumatically connecting face 42 to the rear surface of disc 40. Depressor membrane 48, preferably of thin, highly flexible material, is mounted on ridge 44 and stretches loosely across and covers face 42 of disc 40.

Piston 26 is mounted for reciprocating movement within porous, cylindrical air-bearing 50. The latter typically can be formed of any of a large number of metallic, metalloid or ceramic materials, such as sintered bronze or the like, as is well known in the art. Unlike liquid lubricated surfaces, the use of air-bearing frees the present invention from the need to use friction-compatible materials for the piston and bearing. Bearing 50 is dimensioned, shaped and disposed within enclosure 20 so that it is substantially surrounded, at least on its outer radial surfaces by an air inlet chamber 52. An inlet port 53 is provided for connecting chamber 52 with a source of compressed air.

As will be seen, bearing 50 serves as a porous barrier between chambers 52 and 22. The dimensions of both chamber 52 and and port 53 are not particularly critical inasmuch as air entering chamber 22 is throttled in the porous structure of bearing 50.

Because of bearing 50, it will be appreciated that piston 26 need not be formed with precise tolerance and, indeed, it is preferred that the piston fit rather loosely within bearing 50 so as to ride substantially friction-free on the air cushion or film provided in the piston/bearing interspace 55. Air flow into chamber 22 from chamber 52 is via bearing 50 and thence from interspace 55. Hence the latter should be dimensioned so that sufficient air flows through the bearing and can enter into chamber 22 to exert the desired force on piston 26.

Additionally, because the air path between chamber 52 and 22 traverses a large multiplicity of pores, occasional particulate matter, in the air flow into chamber 52, will not materially vary the throttling effect of the porous structure as would be the case where such particles might clog the usual single small input orifice used to provide throttling in prior art devices.

In order to provide a proper air film in the bearing, the bearing-piston interspace 55 is also vented outwardly through vents 54 which are typically disposed coaxially about the piston where the latter projects outwardly from enclosure 20. Because in use, the air vented from vents 54 might irritate the biological surface upon which measurement is being made, baffle 56 is provided to divert air flow from vents 54. Vents 54, of course, are limited in size so as to permit a substantial pressure to subsist in chamber 22 due to air flow through the bearing.

In operation, air is introduced into chamber 52 through port 53 at a relatively high pressure, typically 10 psi above atmospheric pressure. The air then passes through the porous structure of bearing 50 into interspace 55 between bearing 50 and piston 26 and thence into chamber 22. Because of the porous structure, throttling occurs which insures that the flow rate through chamber 22 will remain substantially constant at least on a short-term basis, and that the distribution of air to the interspace between the piston and bearing is substantially uniform.

Air escaping from vents 54 is deflected by baffle 56 and does not affect measurements made with the instrument. The air flow in piston/bearing interspace 55, however, does provide a friction-free lubrication and automatic alignment of the piston coaxially within the bearing. Air passing out of interspace 55 into chamber 22 can escape from the latter through channel 34 in the center of the piston. Because membrane 48 is supported on ridge 44 and does not obstruct channel 38, the air in the latter escapes freely and the pressure in chamber 22 will be about at the ambient atmospheric value.

If however, membrane 48 is placed in contact, for example with the eye of a patient and pressure exerted against membrane 48 by disc 40, the membrane tends to prevent escape of air from chamber 22 and the pressure in the latter will rise accordingly.

Since the eye surface (cornea or sclera) is of a flexible membrane shown at 60, the system constitutes two fluids (intra-ocular fluid and measuring gas) separated by a double flexible membrane (membrane 60 and membrane 48). The double membrane can distort (in fact, it flattens) until the pressure is the same on both sides of it. This balance or equilibrium comes about because pushing membrane 48 toward disc 40 raises the air pressure in chamber 22, while pushing it away lowers that pressure. At balance, membrane 48 is flat or slightly bowed toward disc 40.

The force balance feature of the system controls the area of contact between the eye and membrane 48 (the applanation area). The force with which membrane 48 is pushed by tip 32 against the eye is actually the force with which the air in the chamber 22 pushes against piston 26. Since the piston has cross-sectional area B, and the gas pressure can be defined as $p_m$, the force pushing on end 28 of the piston is $Bp_m$. At equilibrium, the eye must be exerting an equal force on piston 26. This can be defined as $Ap_e$, where A is the applanation area and $p_e$ the intraocular pressure. If $Ap_e$ is then equal to $Bp_m$, the pressure balance feature requires that $p_e = p_m$, and $A = B$. This means that the applanation area is equal to the piston area, no matter what the intraocular pressure. Tip 32 automatically pushes harder on a high-pressure eye, so that the contact area is always the same. It is only necessary to keep the applanation area smaller than the tip area, so that edge effects do not affect the measurement materially. The measurement of $p_m$ can be quite free, in the present invention, of variations that might otherwise have been introduced by friction between the piston and bearing, or by clogging of a throttling orifice. The relation, however, between the pressures on opposite sides of the double membrane is somewhat more complex because the equilibrium is dynamic rather than static. At equilibrium, the pressure measured in chamber 22 is equal to the highest pressure acting on membrane 48; the intraocular pressure, however, is equal to the average pressure acting on membrane 48. This results in some pneumatic gain G so that more accurately, $p_m = Gp_e$. G is typically about 2, and possibly can be varied between about 0.3 and about 4.

Further, one must also appreciate that because neither membrane is ideally flexible, the air pressure required to balance membrane bending forces is increased. Thus, one can again modify the pressure relationship to $p_m = G(p_e + p_f)$ where $p_f$ represents the bending forces. Such bending forces, which appear to depend largely on the curvature and flexibility of the eye membrane, result in introducing an offset into the curve of $p_m$ vs. $p_e$. Empirically, this offset is about 13 mm Hg for the sclera and about 9 mm Hg for the cornea for the applanation area used in the preferred embodiment.

Small variations in measured pressure are observed with a number of parameters—source pressure, piston extension, gas density, and so forth. All of these are expected to be zero according to the simplified theory, but there are limits. For source pressure and flow rate a 20 percent change causes less than a 5 percent change in measured pressure. Piston extension can introduce a change in $p_m$ which is one or two mm Hg, but is less than one-half mm Hg on most systems (the piston and bearing tolerances are at issue here.)

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. In an applanation tonometer having a pneumatically movable piston-hollow cylinder arrangement and a sensing head mounted on said piston and pneumatically coupled with the operating gas in said cylinder, the improvement comprising of
a bearing in which said piston is movable, said bearing being porous to said gas and being disposed so as to constitute a throttling means for gas entering said cylinder; and
means for providing a gas flow through said bearing and between said piston and cylinder sufficient to lubricate said piston and maintain alignment of said piston in said cylinder.

2. In a tonometer as set forth in claim 1, wherein said bearing surrounds said piston radially, and including a gas chamber disposed about said bearing so that the latter forms a porous barrier between said chamber and said piston, and said chamber and the interior of said cylinder.

* * * * *